June 18, 1968  E. L. PARR  3,388,720
FOUR-WAY VALVE

Filed Sept. 13, 1965  2 Sheets-Sheet 1

INVENTOR.
EDWARD L. PARR
BY
FULWIDER, PATTON, RIEBER, LEE & UTECHT
ATTORNEYS

June 18, 1968  E. L. PARR  3,388,720
FOUR-WAY VALVE

Filed Sept. 13, 1965  2 Sheets-Sheet 2

INVENTOR.
EDWARD L. PARR
BY
FULWIDER, PATTON, RIEBER, LEE & UTECHT
ATTORNEYS

United States Patent Office 3,388,720
Patented June 18, 1968

3,388,720
FOUR-WAY VALVE
Edward L. Parr, El Cajon, Calif., assignor to
Wendell L. Thompson, Burbank, Calif.
Filed Sept. 13, 1965, Ser. No. 486,614
2 Claims. (Cl. 137—625.48)

ABSTRACT OF THE DISCLOSURE

A spool type valve having slits in an elongated sleeve, which slits are elongated and extend longitudinally of the bore in the sleeve, together with a reciprocating valve in the bore which is sealed by O-rings which are adapted to move to both ends of the elongated slits.

---

The present invention relates to a valve for controlling the flow of fluid and more particularly, to the type of valve in which a valve element reciprocates to control the flow of the fluid.

The present invention includes a valve body having a longitudinally extending bore. At least two passages are connected with the bore, one of the passages being disposed longitudinally of the other. The sleeve is disposed within the longitudinally extending bore and is provided with a pasage which is aligned with one of the passages in the bore; the sleeve is also provided with a section having a transversely disposed groove and this groove is aligned with another of the passages in the bore of the body. This section, having the groove, is provided with longitudinally extending slits and these slits extend transversely from the exterior to the interior of the sleeve. A reciprocating valve is disposed within the sleeve, which reciprocating valve has a stem and a sealing surface connected with the stem. The valve is moved whereby the sealing surface section is moved to opposite sides of the slits.

Preferably, the longitudinal length of the slits is such that the cross-sectional area of the slits is at least equal to the transverse area of the interior fitting or a nipple leading to the valve. Also, in the preferred embodiment, the slits are arranged parallelly of one another.

As disclosed in the present illustration, the sleeve is open at both ends and the opposite ends of the reciprocating valve carry sealing sections in sealing relationships with the interior of the sleeve, and, in the preferred embodiment, all sealing sections are in the form of O-rings.

For illustrating purposes, the reciprocating valve is in the form of a reciprocating spool having a stem and sealing surface sections on opposite ends of the stem. These sealing surface sections are spaced longitudinally from one another a distance greater than the distance between the remote portions of the passage in the sleeve and the groove in the sleeve. The spool valve is adapted to be moved to and from positions in which the area between the sealing sections register with the groove in the passage in the sleeve.

The present invention is particularly applicable to a valve of the type in which, when the spool valve is in one position, fluid flows in one direction and when the spool valve is in another position, fluid flows in the opposite direction. In the embodiment illustrated, the sleeve is provided with two sections, each having a groove and each having longitudinally extending slits.

Other features and the advantages of the present invention will be apparent from the following description, reference being had to the accompanying drawings wherein a preferred embodiment of the invention is illustrated.

Figure 1:
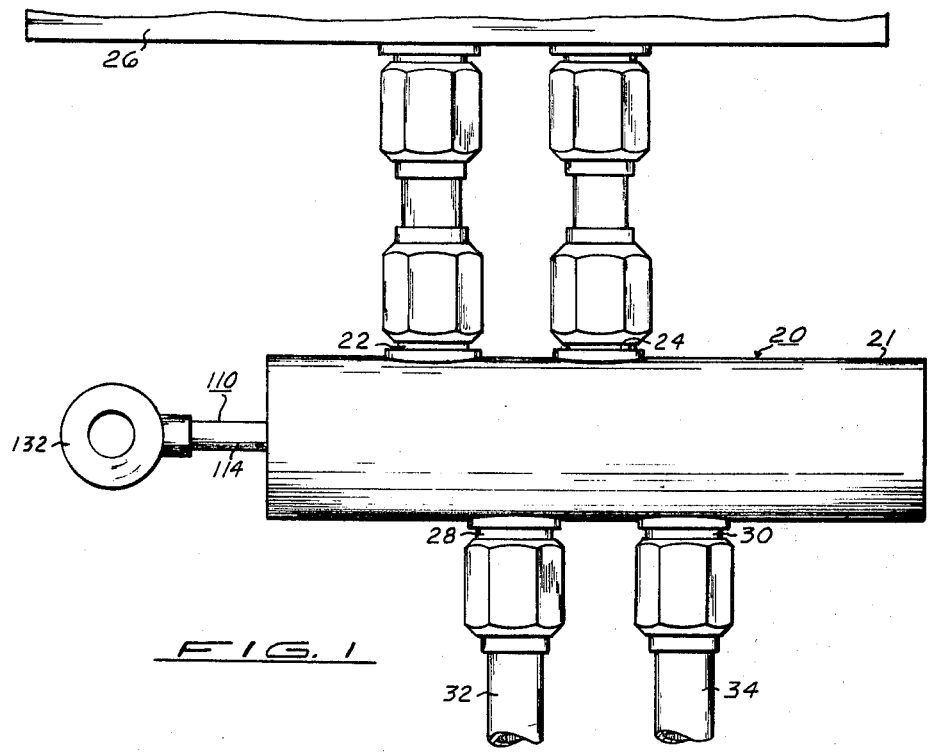
FIG. 1 is a view in elevation of the valve showing the same connected to two hose lines and a fluid actuated motor.

Referring more in detail to the drawings, the valve is shown at 20 including a main body 21 having four nipples or fittings formed integrally therewith, two of which, 22 and 24, are shown as connected in any suitable manner to a fluid actuated motor 26, the other two 28 and 30 being connected, respectively, to conduits 32 and 34.

The valve 21 is an elongated body and is provided with a longitudinally extending bore 38. The nipples 22, 24, 28 and 30 are formed to make passages 40, 42, 44 and 46, respectively. These passages extend into the interior of the bore 38.

The bore 38 of the valve body 21 receives a sleeve 50 having six circumferential grooves 52, 54, 56, 58, 60 and 62 therein, each of which receives, respectively, O-rings 64, 66, 68, 70, 72 and 74. The sleeve 50 is forced into the bore 38 of the valve body 21 by compressing the O-rings. Thus, the O-rings are utilized for fixing the sleeve in position in the bore.

The sleeve 50 is provided with a constant diameter bore and passages 78, 80, 82 and 84 connected therewith which are passages aligned, respectively, with passages 40, 42, 44 and 46 in the valve body 21. The passages 82 and 84 are in the form of circumferential grooves disposed in spool sections 86 and 88 which spool sections are formed integrally with the sleeve. The section 86 is interposed between the O-ring 66 and the O-ring 68, and the section 88 is interposed between the O-ring 70 and O-ring 72. The root or base portions of the grooves 82 and 84 are shown, respectively, at 90 and 92. Each of these integral sections is provided with a series of longitudinally extending slits 94 which also extend transversely from the interior to the exterior of the root. Thus, fluid can flow from the exterior of the groove to the interior 96 of the sleeve or vice versa, as the case may be. The aggregate, longitudinal, cross-sectional area of the slits 94 is at least equal to the transverse area of the interior 96 of the sleeve whereby the slits 94 are capable of handling all of the fluid that can pass through the interior of the sleeve. It will be observed from FIG. 4 that the slits are arranged parallelly of one another. In this manner, the sleeves can be formed of a molded plastic, in which the mold for forming the sleeve may comprise two semi-circular portions having webs, which when withdrawn, provide the sleeve with the slits.

Figure 5:
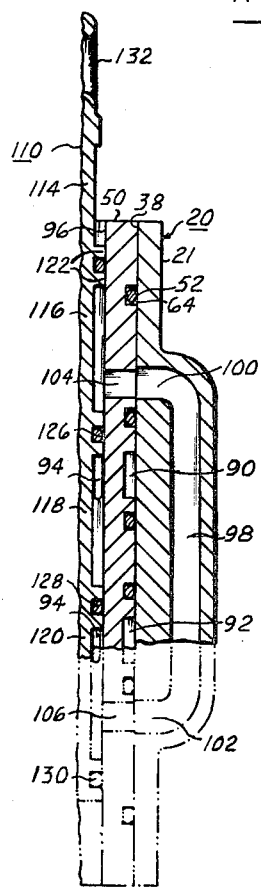
FIG. 5 is a fragmentary sectional view taken along line 5—5 of FIG. 4, but on a smaller scale.

Referring to FIG. 5, it will be observed that the valve body 21 is provided with a by-pass 98 having a passage 100 and a passage 102 leading into the interior of the bore 38. The passage 100 is disposed in the same transverse plane and at right angles with respect to passage 40 and the passage 102 is disposed to the right of passage 42. Referring now to FIG. 5, it will be seen that passages 104 and 106 in sleeve 50, are aligned, respectively, with passages 100 and 102 in the valve body.

The reciprocating valve is shown in the form of a spool 110, the stem of which includes sections 114, 116, 118 and 120, which sections are separated from one another by pairs of circular flanges 122, which receive O-rings 124, 126 and 128. The right end of the stem carries flanges 122 for an O-ring 130. The left end of the stem carries a handle 132 for manipulating the spool valve. The O-rings snugly fit within the bore 96 of the sleeve 50.

Figure 2:
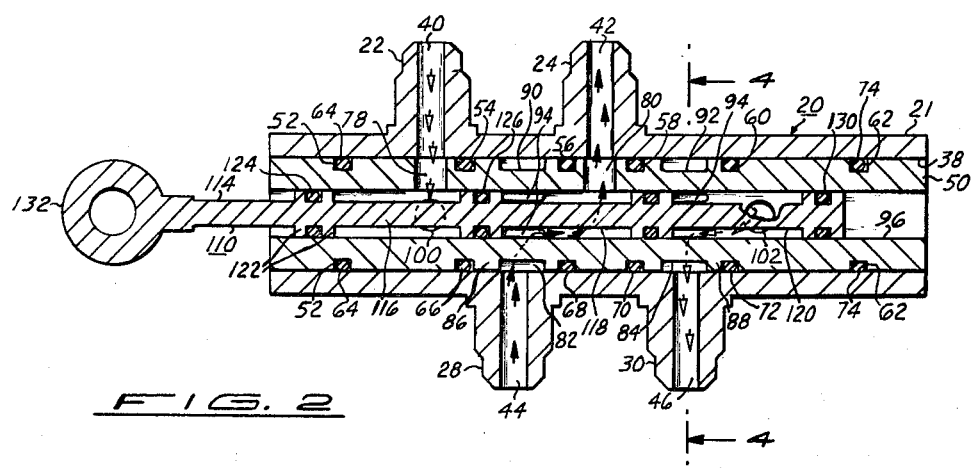
FIG. 2 is a cross-sectional view of the valve shown in FIG. 1, the arrows indicate the direction of flow of the fluid.

The conduit 32 is connected to the high pressure side of a fluid system and conduit 34 is connected to the low pressure side of the system, and, assuming that the element 26 is a motor, then when the valve is in the position shown in FIG. 2, fluid will pass from the conduit 32 through the nipple 28, passage 44 of valve body 21, groove 82 of sleeve 50, slits 94 to the interior 96 of the sleeve, passages 80 in the sleeve and 42 in valve body 21, nipple 24, through the element 26, from the element 26 to the nipple 22, passages 40 and 78, respectively, in the valve body 21 and the sleeve 50, interior 96 of the sleeve, passage 100, by-pass 98, passages 102 and 106 in the valve body and sleeve, respectively, to the interior 96 of the sleeve, through passages 84 and 46, respectively, and the sleeve and valve body 21, nipple 30 to the return conduit 34.

Figure 3:
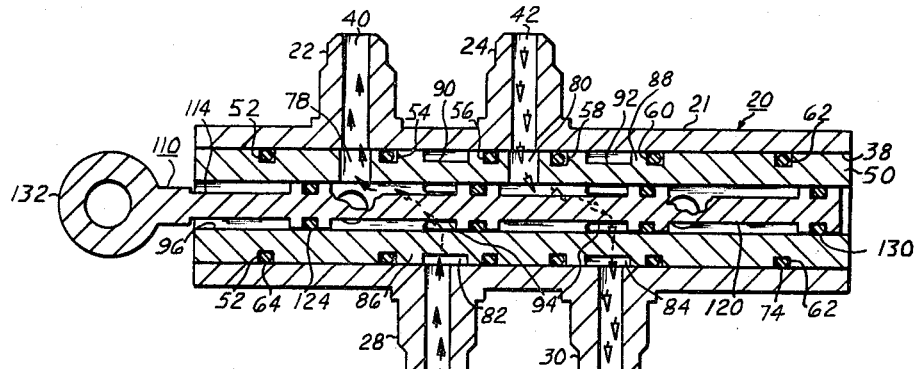
FIG. 3 is a view similar to FIG. 2, but showing the spool valve in a different position and showing the direction of flow of the fluid by the arrows.

When, however, the spool valve 110 is moved from the position shown in FIG. 2, to that shown in FIG. 3, then the fluid flows through the element 26 in a reverse direction in the following path: conduit 32, nipple 28, passage 44, groove 82 in section 86, slits 94 to the interior 96 of the sleeve 50, passages 78 and 40, respectively, and the sleeve and valve body, nipple 22, element 26, from the element 26 through the nipple 24, passages 42 and 80, to the interior 96 of the sleeve, then through slits 94 in the root 92 of section 88, through the groove 84, passage 46 in the valve body, nipple 30 and return to conduit 34.

Thus, it will be seen that by merely shifting a spool valve 110 from one position to another position the flow of fluid through the element 26 can be reversed. This element may be in the form of a reversible, hydraulically or pneumatically operated motor or pump.

In one embodiment of the invention, the inside diameters of the nipples are each .25 of an inch; the slits are approximately .25 of an inch in horizontal length with a width of .032 of an inch, there being eight slits 94, four slits on each of the opposite sides of the base or roots 90 and 92. Thus, the internal cross-sectional area of a nipple is approximately .049 of an inch while the longitudinal cross-sectional area of the slits of one section is approximately .064 of an inch.

Figure 4:
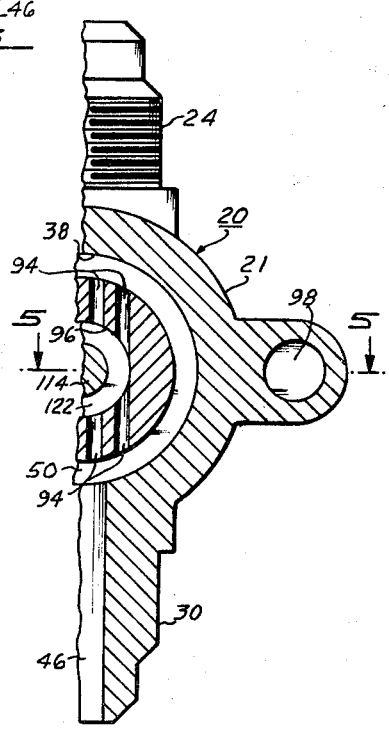
FIG. 4 is a sectional view taken along line 4—4 of FIG. 2, but on a larger scale.

As is apparent from FIGS. 2 and 4, the latter being twice the scale of that of FIG. 2, the thickness of the material forming the O-ring is greater than the width of any of the slits. Inasmuch as the slits are relatively narrow, substantially no distortion can take place in the O-rings on the stem 112 as the O-rings move through the slit portions, and since substantially no distortion takes place in the O-rings, abrasion of the O-ring is substantially eliminated whereby the life thereof is materially prolonged.

In the preferred embodiment of the invention, the valve body 21, the sleeve 50 and the stem 110 can be formed of molded plastic, preferably of the permanent setting type and the O-rings are preferably formed of resilient rubber or resilient synthetic rubber. In the assembly of the valve, it is necessary only to press the sleeve 50 into position and it will be sealed in this position and thereby fixed in this position by the O-rings about the same. The end sleeve may be of the open type at each end since the O-rings 124 and 138 seal the ends of the sleeve.

While the form of embodiment herein shown and described constitutes preferred form, it is to be understood that other forms may be adopted falling within the scope of the claims that follow.

I claim:
1. A valve for controlling the flow of fluid comprising in combination:
   (A) a valve body having:
      (1) a longitudinally extending bore therein;
      (2) a passage connected with the bore;
      (3) a second passage connected with the bore and disposed longitudinally of the first mentioned passage;
   (B) an elongated sleeve disposed within and extending longitudinally of the bore, said sleeve being stationary in the bore and having:
      (1) a constant diameter longitudinally extending bore;
      (2) a passage aligned with the first mentioned passage in the bore in the valve body and the bore in the sleeve;
      (3) an integral section having a transversely disposed groove, said groove being aligned with the second mentioned passage in the bore, said grooved section being provided with:
         (a) slits, all extending transversely and parallelly from the exterior to the interior of the sleeve and elongated substantially longitudinally of the bore of the sleeve;
      (4) circumferential grooves in the sleeve disposed at opposite ends of the slits;
   (C) O-rings in said circumferential grooves;
   (D) a reciprocal valve disposed within the sleeve, said valve having:
      (1) a stem;
      (2) a resilient O-ring surrounding the stem, the thickness of the material forming the O-ring being greater than the width of a slit;
   (E) and means for moving the O-ring to opposite ends of the slits.
2. A valve as defined in claim 1, characterized to include:
   (F) a fitting leading to the sleeve;
   (G) a fitting leading from the sleeve;
and further characterized in that the aggregate, longitudinal, cross-sectional area of the slits is at least equal to the transverse area of either of the fittings.

References Cited

UNITED STATES PATENTS

| 2,997,065 | 8/1961 | Johnson | 137—625.69 |
| 3,049,239 | 8/1962 | Rudelick | 137—625.48 XR |
| 1,395,756 | 11/1921 | McReynolds et al. | 137—625.69 |
| 2,540,467 | 2/1951 | Williams | 137—625.69 |
| 3,152,614 | 10/1964 | Carls | 137—625.69 |
| 3,279,748 | 10/1966 | Coulter | 137—625.69 X |

FOREIGN PATENTS 830,925 3/1960 Great Britain.

HENRY T. KLINKSIEK, *Primary Examiner.*
M. CARY NELSON, *Examiner.*